US008414373B2

(12) United States Patent
Bone et al.

(10) Patent No.: US 8,414,373 B2
(45) Date of Patent: Apr. 9, 2013

(54) WAGERING GAME MACHINE WITH WIRELESS PERIPHERALS

(75) Inventors: Robert Bone, Chicago, IL (US); Christopher Brewer, Bloomington, IL (US); Mark B. Gagner, West Chicago, IL (US); Eric M. Pryzby, Skokie, IL (US); Richard T. Schwartz, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 12/301,522

(22) PCT Filed: May 18, 2007

(86) PCT No.: PCT/US2007/012061
§ 371 (c)(1), (2), (4) Date: Nov. 19, 2008

(87) PCT Pub. No.: WO2007/136826
PCT Pub. Date: Nov. 29, 2007

(65) Prior Publication Data

US 2009/0197673 A1 Aug. 6, 2009

Related U.S. Application Data

(60) Provisional application No. 60/747,716, filed on May 19, 2006.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC ............ 463/16; 463/42

(58) Field of Classification Search ............ 463/16, 463/42
See application file for complete search history.

(56) References Cited

U.S. PATENT DOCUMENTS

| | | | | |
|---|---|---|---|---|
| 5,707,286 | A | 1/1998 | Carlson | |
| 5,807,177 | A * | 9/1998 | Takemoto et al. | 463/47 |
| 6,089,663 | A * | 7/2000 | Hill | 297/258.1 |
| 6,422,941 | B1 * | 7/2002 | Thorner et al. | 463/30 |
| 6,530,842 | B1 * | 3/2003 | Wells et al. | 463/46 |

(Continued)

FOREIGN PATENT DOCUMENTS

WO WO-2004075128 A1 9/2004

OTHER PUBLICATIONS

International Application No. PCT/US2007/012061, International Written Opinion mailed on May 28, 2008, 5 pgs.

(Continued)

*Primary Examiner* — Fernando L Toledo
*Assistant Examiner* — Karen Kusumakar
(74) *Attorney, Agent, or Firm* — Schwegman Lundberg & Woessner, P.A.

(57) ABSTRACT

A wireless computerized wagering game system comprises a gaming module operable to present a wagering game on which monetary value can be wagered, and a wireless communications module operable to connect the wireless wagering game system to at least one wireless peripheral device. The wireless computerized wagering game is portable, is operable to couple to fixed and portable peripheral devices, and is operable to couple to user-provided and gaming establishment-provided peripherals in various embodiments.

25 Claims, 6 Drawing Sheets

U.S. PATENT DOCUMENTS

| | | | | |
|---|---|---|---|---|
| 6,682,421 | B1 | 1/2004 | Rowe et al. | |
| 6,846,238 | B2 | 1/2005 | Wells | |
| 6,899,627 | B2 | 5/2005 | Lam et al. | |
| 6,997,803 | B2 | 2/2006 | LeMay et al. | |
| 7,125,074 | B2 * | 10/2006 | Real et al. | 297/217.3 |
| 2003/0064805 | A1 * | 4/2003 | Wells | 463/39 |
| 2003/0100372 | A1 * | 5/2003 | Gatto et al. | 463/42 |
| 2003/0104865 | A1 * | 6/2003 | Itkis et al. | 463/39 |
| 2003/0118015 | A1 * | 6/2003 | Gunnarsson et al. | 370/389 |
| 2003/0199312 | A1 * | 10/2003 | Walker et al. | 463/25 |
| 2004/0082385 | A1 * | 4/2004 | Silva et al. | 463/40 |
| 2004/0166917 | A1 | 8/2004 | Lam et al. | |
| 2004/0166932 | A1 | 8/2004 | Lam et al. | |
| 2004/0254006 | A1 | 12/2004 | Lam et al. | |
| 2005/0266922 | A1 * | 12/2005 | Lee | 463/37 |
| 2005/0282631 | A1 * | 12/2005 | Bonney et al. | 463/35 |
| 2006/0068920 | A1 | 3/2006 | Lemay et al. | |
| 2007/0111774 | A1 * | 5/2007 | Okada | 463/16 |
| 2007/0270216 | A1 * | 11/2007 | Pryzby | 463/35 |
| 2008/0073953 | A1 * | 3/2008 | Tamara | 297/217.4 |
| 2008/0111408 | A1 * | 5/2008 | Duran et al. | 297/217.4 |

OTHER PUBLICATIONS

International Application No. PCT/US2007/012061, International Search Report, mailed on May 28, 2008, 4 pgs.

* cited by examiner

WAGERING GAME MACHINE WITH WIRELESS PERIPHERALS

RELATED APPLICATION

This patent application is a U.S. National Stage Filing under 35 U.S.C. 371 from International Patent Application Serial No. PCT/US2007/012061, filed May 18, 2007, and published on Nov. 29, 2007, as WO 2007/136826 A2 and republished as WO 2007/136826 A3, which claims the priority benefit of U.S. Provisional Patent Application Ser. No. 60/747,716 filed May 19, 2006 and entitled "WAGERING GAME MACHINE WITH WIRELESS PERIPHERALS", the contents of which are incorporated herein by reference in their entirety.

FIELD OF THE INVENTION

The invention relates generally to computerized wagering game systems, and more specifically to wireless wagering game machines incorporating wireless peripheral support.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2006, 2007, WMS Gaming, Inc.

BACKGROUND

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

The elements of computerized wagering game systems are in many ways the same as the elements in the mechanical and table game counterparts in that they must be fair, they must provide sufficient feedback to the game player to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Computerized wagering games do not rely on the dealer or other game players to facilitate game play and to provide an entertaining game playing environment, but rely upon the presentation of the game and environment generated by the wagering game machine itself Incorporation of audio and video features into wagering games to present the wagering game, to provide help, and to enhance the environment presented are therefore important elements in the attractiveness and commercial success of a computerized wagering game system. Music and environmental effects are also played through speakers in some wagering game systems to enhance or complement a theme of the wagering game. These sounds typically accompany video presentation of the wagering game on a screen, which itself often includes animation, video, and three-dimensional graphics as part of presentation of the wagering game.

These features are typically built into a wagering game cabinet that is placed in a stationary position within a wagering game facility. But, as wireless network technology, security, and electronic technology continue to advance, it is anticipated that smaller, portable wireless wagering game machines will allow a wagering game user a greater degree of flexibility in where and when a wagering game can be played than was previously possible.

SUMMARY

One example embodiment of the invention comprises a wireless computerized wagering game system comprising a gaming module operable to present a wagering game on which monetary value can be wagered, and a wireless communications module operable to connect the wireless wagering game system to at least one wireless peripheral device. The wireless computerized wagering game is portable, is operable to couple to fixed and portable peripheral devices, and is operable to couple to user-provided and gaming establishment-provided peripherals in various further example embodiments.

DETAILED DESCRIPTION

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments.

The following detailed description does not, therefore, limit the scope of the invention, which is defined only by the appended claims.

Various embodiments of the invention seek to provide wireless wagering game machines the ability to operate and interact with wireless peripheral devices. One example embodiment of the invention comprises a wireless computerized wagering game system comprising a gaming module operable to present a wagering game on which monetary value can be wagered, and a wireless communications module operable to connect the wireless wagering game system to at least one wireless peripheral device. The wireless computerized wagering game is portable, is operable to couple to fixed and portable peripheral devices, and is operable to couple to user-provided and gaming establishment-provided peripherals in various further example embodiments.

Figure 1:
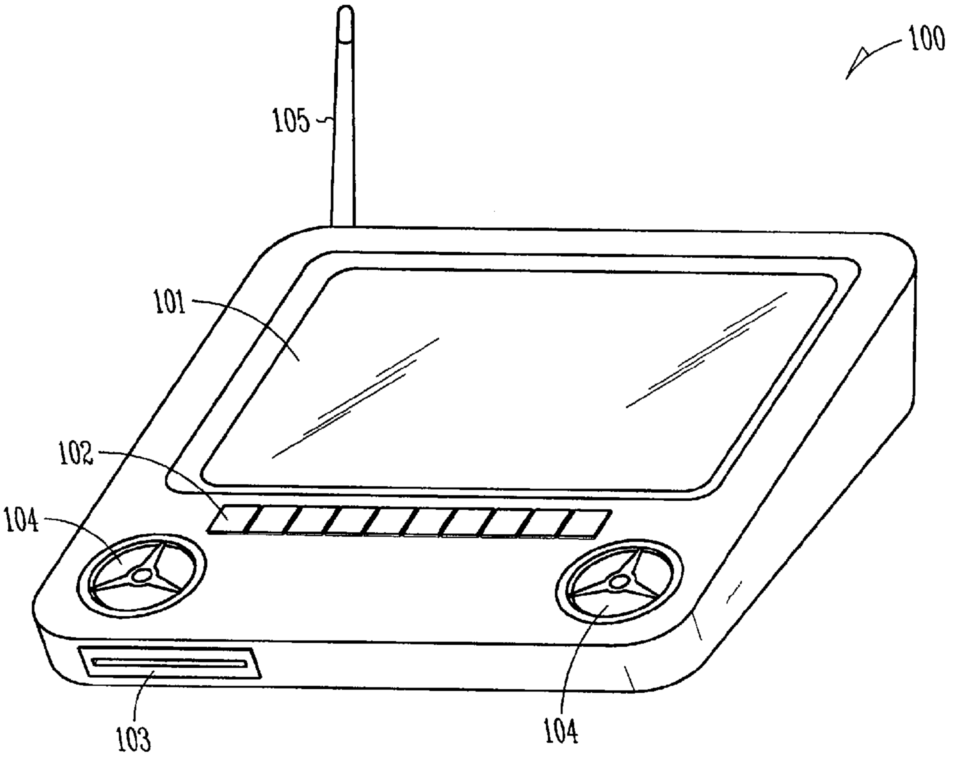
FIG. 1 shows a computerized wagering game machine, as may be used to practice some embodiments of the invention.

FIG. 1 illustrates a portable wireless networked computerized wagering game machine, as may be used to practice some embodiments of the present invention. The computerized gaming system shown generally at 100 is a video wagering game system, which displays information for at least one wagering game upon which monetary value can be wagered on video display 101. Video display 101 is in various embodiments a plasma display, an LCD display, a vacuum fluorescent display, a surface conducting electron emitter display, or any other type of display suitable for displaying electronically provided display information. Alternate embodiments of the invention will have other game indicators, such as mechanical indicators, lights, and other indicators.

A wagering game is presented using software within the wagering game machine, such as through instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. For example, in one embodiment the wagering game software is loaded from nonvolatile memory in a compact flash card, and a hash value is calculated or a digital signature is derived to confirm that the data stored on the compact flash card has not been altered. The game of chance implemented via the loaded software takes various forms in different wagering game machines, including such well-known wagering games as reel slots, video poker, blackjack, craps, roulette, or hold'em games. In some further embodiments, a secondary game or bonus game is also available, and other information such as progressive slot information or other community game information is displayed.

The wagering game is played and controlled with inputs such as various buttons or keys 102 or via a touchscreen overlay to video screen 101. The touchscreen is used in some embodiments to display virtual buttons, which can have unique functions in some embodiments, or can duplicate the functions provided by the mechanical buttons 102 in other embodiments. In some alternate examples, other devices are employed to provide other input interfaces to the game player. The player interface components are in this example contained within or mechanically coupled to the wagering game system, but in other embodiments will be located outside the wagering game system enclosure such as by a wired or wireless electronic connection to the wagering game system.

Monetary value is typically wagered on the outcome of the games, such as with tokens, coins, bills, or cards that hold monetary value. The wagered value is conveyed to the machine such as through a secure user identification module interface or a ticket reader 103, and winnings are returned such as via a returned value ticket or a stored value card. Sound is also provided through speakers 104, typically including audio indicators of game play, such as reel spins, credit bang-ups, and environmental or other sound effects or music to provide entertainment consistent with a theme of the computerized wagering game. In some further embodiments, the wagering game machine is coupled to a network via a wireless network antenna 105, and is operable to use its network connection to receive wagering game data, track players and monetary value associated with a player, and to perform other such functions.

In other embodiments, the computerized wagering game system takes one or more other forms, such as various types of stationary or portable wagering game devices, server-based wagering game devices, or a networked wagering game system. These other computerized wagering game system embodiments need not contain all features of the wagering game system of FIG. 1, which does not limit the scope of a computerized wagering game but is provided as an example only.

Figure 2:
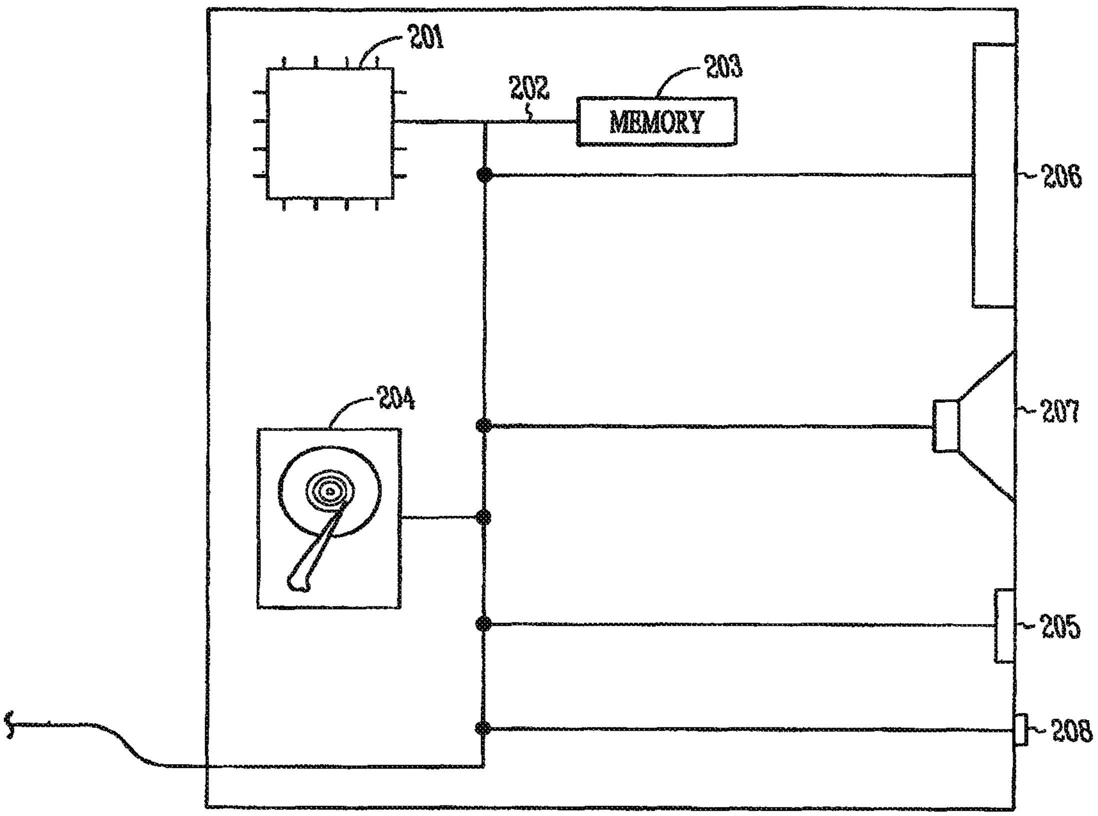
FIG. 2 is a block diagram of a computerized wagering game machine as may be used to practice some embodiments of the invention.

FIG. 2 shows a block diagram of an example embodiment of a wagering game system. The wagering game system includes a processor 201, which is sometimes called a microprocessor, controller, or central processing unit (CPU). In some embodiments, more than one processor is present, or different types of processors are present in the wagering game system, such as using multiple processors to run gaming code, or using dedicated processors for audio, graphics, security, or other functions. The processor is coupled via a bus 202 to various other components, including memory 203 and nonvolatile storage 204. The nonvolatile storage is able to retain the data stored therein when power is removed, and in various embodiments takes the form of a hard disk drive, nonvolatile random access memory such as a compact flash card, or network-coupled storage. Further embodiments include additional data storage technologies, such as compact disc, DVD, or HD-DVD storage in the wagering game system.

The bus 202 also couples the processor and components to various other components, such as a value acceptor 205, which is in some embodiments a token acceptor, a card reader, or a biometric or wireless player identification reader. A touchscreen display 206 and speakers 207 serve to provide an interface between the wagering game system and a wagering game player, as do various other components such as buttons 208, pullarms, and joysticks. These components are located in a portable wagering game machine such as that of FIG. 1 in some embodiments, but can be located in multiple enclosures comprising a wagering game system or outside a wagering game machine cabinet in other embodiments, or in alternate forms such as a stationary or other device.

In operation, the wagering game system loads program code from nonvolatile storage 204 into memory 203, and the processor 201 executes the program code to cause the wagering game system to perform desired functions such as to present a wagering game upon which monetary value can be wagered. This and other functions are provided by various modules in the computerized system such as an audio module, a game presentation module, or a touchscreen display module, where such modules comprise in some embodiments hardware, software, mechanical elements, manual intervention, and various combinations thereof.

FIGS. 3A-D show a portable wagering game system establishment, providing a variety of wireless peripheral devices with which the wireless wagering game system is operable to interact in various example embodiments of the invention. A wagering game machine user uses a portable wagering game system 301, such as a tablet computer-style game machine, a special-purpose portable wagering game device, or a device such as a personal digital assistant (PDA) or cellular phone executing software such that it is able to present a wagering game to the game player.

In operation, the wireless wagering game machine 301 is operable to present a wagering game to a game player, such as to show images on a display or play sounds through speakers to indicate the state of the game being played. In a further embodiment, the wagering game is conducted on a server, and the results of the game are relayed via a wireless network to the wireless wagering game system 301 for presentation to the game player. The wireless game system in this example embodiment of the invention is further operable to wirelessly communicate with or couple to one or more peripheral devices, such as to send sound information to audio chair 302, send sound and video information to a bartop display shown at 306, or to send audio to a headset such as Bluetooth headset 309.

Presentation of the wagering game in some embodiments comprises presentation of a game conducted elsewhere, such as on a wagering game server, and comprises in still other embodiments presentation of the game on a peripheral device such as a wireless peripheral device shown in FIGS. 3A-D. For example, one embodiment includes a portable wireless wagering game device 301 with a display operable to show a wagering game being conducted on a remote server, and routes the audio to an audio chair 302.

The audio chair example shown at 302 illustrates how a peripheral device can be built into a fixture within a game establishment, such as into a chair, table, or wall. In this example, the game player sits in the provided chair to use the wireless wagering game device 301, such as within a lounge or restaurant area, or within a gaming-specific area of the gaming establishment. The chair includes one or more speakers 303 that are operable to play sound to a chair occupant. The wireless wagering game system is operable to establish a connection with the audio chair's controller 304, such that audio information from the wagering game system such as sound effects, music, instructions, communication with an attendant, selected broadcast programming, or other audio information available via the wireless wagering game system 301 is sent to the controller 304 of the audio chair for playback via the audio chair's speakers 303. In a further embodiment, the audio chair includes other features, such as a bass shaker 305 that is operable to vibrate the chair to enhance the low frequency effect presented to a wagering game player sitting in the chair without disturbing other wagering game establishment patrons.

Other examples of fixed peripheral devices not shown in FIGS. 3A-D include a wall-mounted display or projector used to display images; speakers embedded in walls, tables, or other furniture or building elements used to present sounds; and buttons, keys, or touchscreen elements a game player can use to provide input to the wireless wagering game machine 301.

In another example, a bar 306 includes a touchscreen display 307, along with a speaker 308 that can be used as peripheral devices in communication with a wireless wagering game machine 301. The wagering game player sits at the bar and associates the player's wagering game machine 301 with the peripheral devices the wagering game player wishes to use, such as touchscreen display 307 and speaker 308, and is able to play the wagering game using the controls and presentation peripherals built into the bar rather than the controls and other devices built into the wagering game machine 301. This enables use of potentially higher quality peripheral devices than are available on a portable wireless wagering game machine such as that shown at 301, such as a larger, brighter, or higher resolution display, more powerful or higher fidelity speakers, and buttons or other input devices that are larger, more robust, or more easily usable.

These peripheral devices communicate wirelessly with the wireless wagering game machine 301, enabling easy communication between the peripherals and the wagering game machine, whether configured by the wagering game player or the wagering game establishment. The peripheral devices are linked to the wireless wagering game system via various wireless routers, controllers, or other intermediate network or processing elements in various embodiments. In one such example, the wireless wagering game machine 301 is located a greater distance from the peripheral devices, such as in another room or elsewhere in the wagering game establishment, and relies on a wireless router, wired network, or other network elements in addition to a wireless link to communicate with the peripheral device.

A Bluetooth earpiece including a speaker and a microphone element is shown at 309, such as is commercially available from vendors for use with certain Bluetooth-enabled wireless devices. In this example, the wagering game player can use the Bluetooth headset the wagering game player already owns, or can use a headset provided by nor purchased from the wagering game establishment, to communicate with the wireless wagering game system. In one example, the wagering game is simply played on the wireless wagering game device 301, and wagering game sounds are conveyed to the Bluetooth headset 309. In another example, the user is able to communicate with other wagering game players, such as those in a user-defined group, those wagering game players playing the same community game, or other groups of wagering game players via the microphone and speaker in the Bluetooth headset via its connection with the wireless wagering game system 301. In still another example, the wagering game player is able to address specific game players, game attendants, or other people in or external to the wagering game facility via the Bluetooth headset and the wireless wagering game machine, such as making or receiving a phone call or conducting a conversation using voice over IP (VOIP) technology with a remote networked person.

The Bluetooth headset 309 can be used in a still further embodiment to present or send other audio information via its connection with the wireless wagering game system 301, such as to listen to a multimedia program such as a broadcast event or program. One example is a user watching a particular sporting event in a sports wagering parlor, in which the game player can place a wager via the portable wireless wagering game device 301 on a selected event and then watch and listen to the event via the portable wireless wagering game device 301 and peripheral devices such as the Bluetooth headset 309.

Figure 3A:
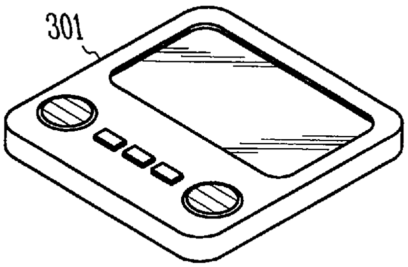
FIGS. 3A-3D illustrate a variety of wireless peripheral devices operable to work in association with a wireless wagering game system, consistent with various example embodiments of the invention.
Figure 3B:
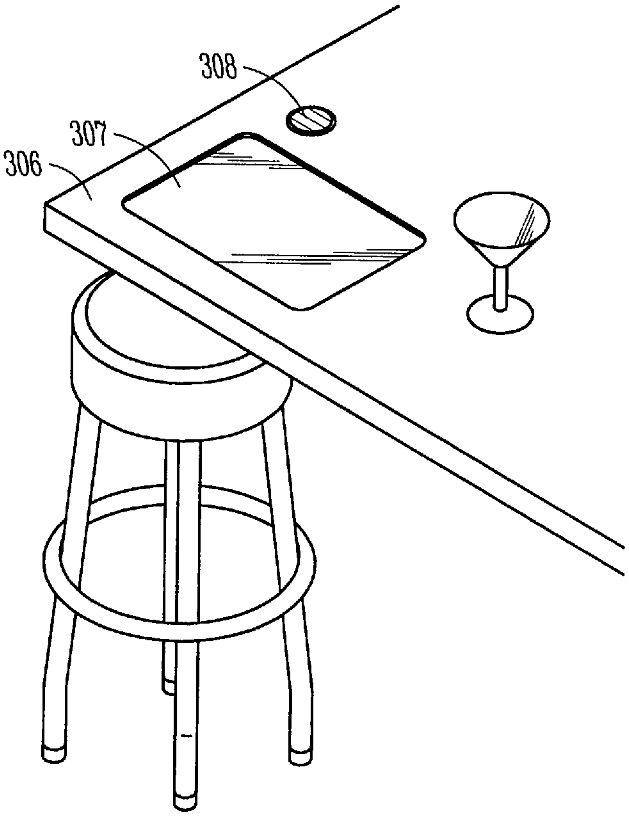
Figure 3C:
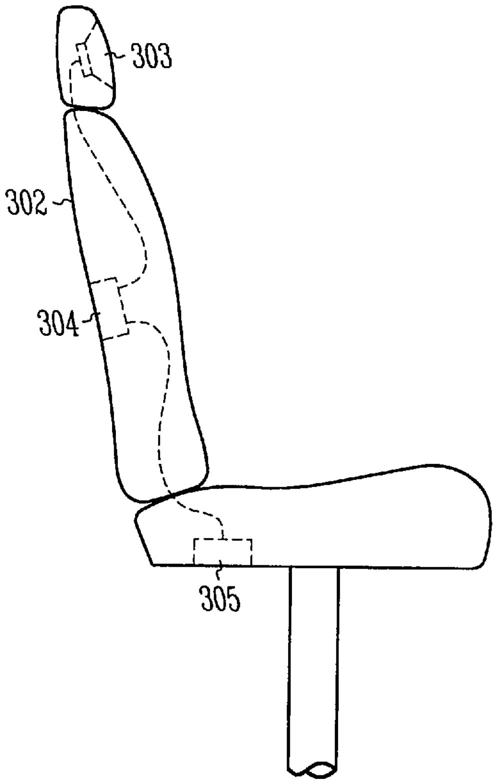
Figure 4:
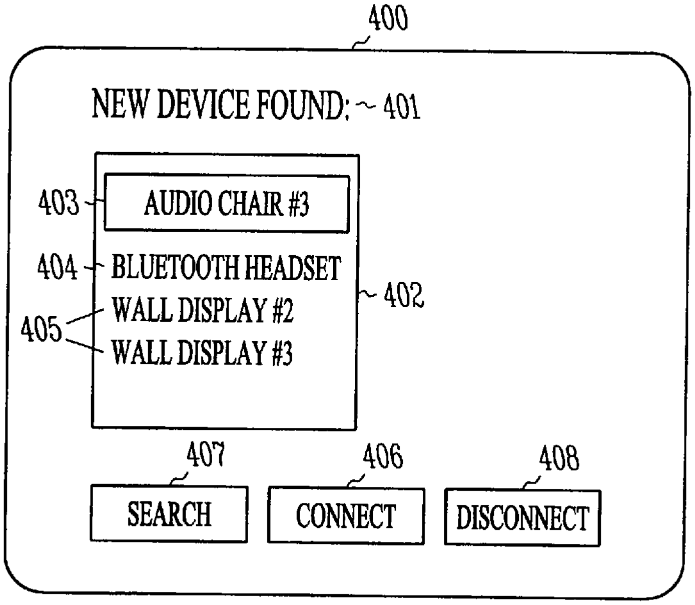
FIG. 4 is touchscreen display image as may be used to configure a wireless peripheral device connection to a wireless wagering game system, consistent with some example embodiments of the invention.

In some embodiments, the link between the wireless wagering game device and the peripheral device happens automatically, while in other embodiments some degree of user intervention or configuration is required. For example, a user sitting in the audio chair pictured at 302 with a portable wireless wagering game machine in his lap is in one example automatically linked to the audio chair's wireless controller 304, or is automatically prompted to associate or communicate with the audio chair. In another example, the user must manually choose to link to a wireless device in the vicinity of the wireless wagering game system FIG. 4 shows a screen shot of one example user control for managing wireless peripheral connections, consistent with an example embodiment of the invention. In this example, a touchscreen display 400, such as may be displayed on the touchscreen of the portable wireless gaming device or on an associated touchscreen such as the bartop touchscreen of FIG. 3B, presents information relating to wireless peripheral devices, and facilitates connection with these devices.

In one such embodiment, the screen is triggered by proximity to a wireless peripheral device, or by recognition of a certain type of wireless peripheral device. For example, the screen may not be triggered by each Bluetooth headset that is detected given the common nature of such headsets and the relatively long distance over which they can communicate, but may trigger the screen upon detecting an audio chair, knowing that the wireless range of the audio chair is intentionally limited to those sitting in the chair or who are very near to the chair.

The recognized audio chair is therefore shown in this example as part of a screen brought up automatically as a result of a new device being found, as indicated at 401. The device is indicated as being currently selected by the box shown around the audio chair at 403, but in other embodiments will be the only device shown or will be identified as the selected peripheral device by other means.

In other embodiments, selected devices, connected devices, and other such groups or types of devices will be identified in other ways, such as by different font, color, background, or other characteristics.

Here, the selected audio chair #3 as shown at 403 is one wireless peripheral device in a list of other peripheral devices within range of the wireless gaming system, including a Bluetooth headset 404, a wall display #2 as shown at 405, and a wall display #3 as shown at 406. The selected audio chair shown at 403 can be connected to the wireless wagering game system by using the touchscreen "connect" button 406, or new peripheral devices can be searched by using the "search" button 407.

In some alternate embodiments, linkage to peripheral devices occurs automatically, such as where a wireless wagering game device automatically links with an audio chair based on its perceived proximity to the chair through the signal strength of the wireless communication between the audio chair and the wireless wagering game system. In another example, the physical location of the wireless wagering game device and peripheral devices are at least approximately known such as by radio triangulation or estimation of position based on received signal strength, and proximity is determined based on knowledge of the device's relative locations. Some wireless peripheral devices may be shared, such as where a wireless wagering game system in one example automatically links to one or more shared peripheral devices, such as a display that shows particularly interesting game events or that is made available to players based on criteria such as rank, time played, player points, or random selection.

In a more detailed example, a player entering a wagering game lounge may sit in an audio chair and elect via a screen such as that of FIG. 4 to associate with the audio chair, and may disassociate or disconnect the wireless wagering game device he is presently using from his Bluetooth headset such as by using disconnect button 408 or turning off the headset. The wagering game player's player tracking points give him priority to have his game activity displayed on a wall mounted display such as wall displays #2 and #3, which are therefore made available to him via the touchscreen control of FIG. 4. The wireless wagering game system automatically connects to a wireless peripheral sound and light system in the wagering game facility's game lounge, such that when the player wins a jackpot, enters a bonus round, or when another such event of interest occurs, audio and sound effects are played indicating the player and the nature of the event, and lights or display images on wall displays are triggered to light up, flash, or show the nature of the game event.

Figure 3D:
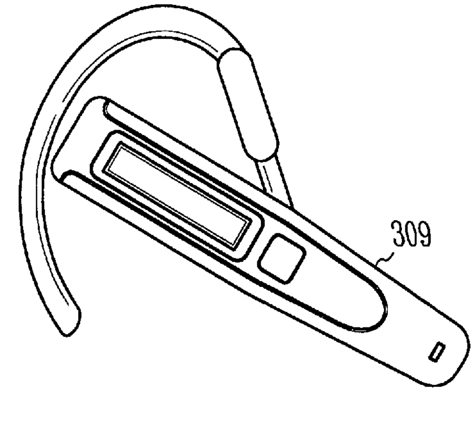

The technologies used to connect to wireless peripheral devices are not limited to Bluetooth, as was used in the example headset 309 of FIG. 3D, but include any other wireless connection technology, including infrared communication such as an Infrared Data Association (IrDA) connection, ultrasonic or other sound-based wireless connection, an Institute of Electrical and Electronics Engineers (IEEE) 802.11 wireless network connection, an RFID) or other simple data exchange connection, or other suitable wireless connection.

Figure 5:
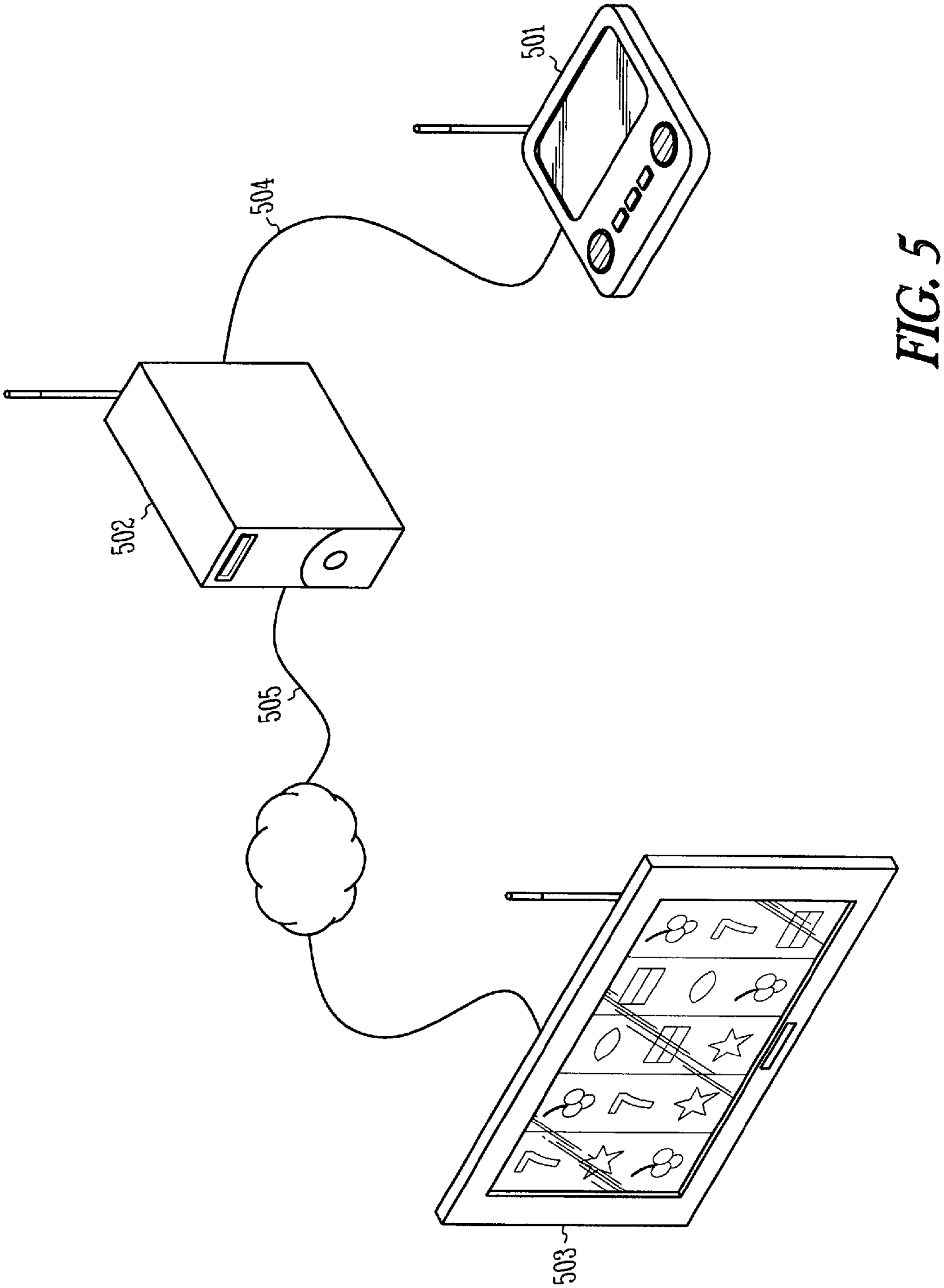
FIG. 5 is a diagram illustrating a variety of ways in which a wireless wagering game system can wirelessly communicate with a wireless peripheral device, consistent with various example embodiments of the invention.

The actual connection between the wireless gaming device and the wireless peripheral device is wireless at some point, but need not be a direct wireless connection from one element to the other. FIG. 5 illustrates several ways in which a variety of wireless and wired connections can be used to link a wireless wagering game system to a peripheral device. The wireless wagering game system 501 is in one such example linked to a peripheral display device 503 via a server or other computerized system 502, through a wireless connection. The server 502 then uses a wired network connection 505 to reach the peripheral display device 503, such that the peripheral communication is carried between the wireless wagering game system 501 and the peripheral display device 503 partly using a wireless connection and partly using a wired connection. In another such example, the server 502 is located in close proximity to the wireless wagering game system 501 to ensure good reception or communication between the server and the wireless wagering game system, such as where one or more wireless access points coupled to a server are located throughout a wireless gaming lounge, pool area, or other such gaming area of a wagering game establishment.

The connection between the server 502 and the peripheral display device 503 can also be entirely wireless, or can include a wireless component in various embodiments, as shown by the antennas on server 502 and on peripheral display device 503. The connection between the wireless display device and the peripheral device can also be directly between a wireless wagering game device 501 and a peripheral device such as peripheral display 503, or can be route through intermediate devices such as server 502 in various embodiments. A wireless connection between an intermediate server 502 and a peripheral device 505 will be used in some embodiments even where the connection between the wireless wagering game device and the intermediate server is wireless rather than using a direct wireless connection between the peripheral device and the wireless wagering game system, such as where the server is relied upon to assign peripheral device access and to prioritize peripheral device availability and assignment.

These examples show how a wide variety of peripheral devices can be connected to or operate in association with a wireless wagering game device to provide additional or enhanced functionality to the wireless wagering game system. Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A computerized handheld wagering game device configured to connect to an audio chair on which a player holding the handheld game device sits, the audio chair including one or more audio speakers and a wireless controller configured to wirelessly receive game sounds for playback via the one or more audio speakers, the handheld game device comprising:

a wireless communication interface;

at least one input device;

at least one display device;

one or more processors; and at least one memory device storing instructions that, when executed by the one or more processors, cause the handheld game device to:

wirelessly connect to the audio chair via the wireless communication interface;

receive, in response to an input via the input device, a wager to initiate a wagering game;

display, on the display device, the wagering game; and while displaying the wagering game on the display device, wirelessly convey one or more game sounds to the wireless controller of the audio chair for playback via the one or more speakers to the player.

2. The device of claim 1, wherein the instructions further cause the handheld device to recognize the audio chair in close proximity to the handheld device and automatically display a connection screen offering the player an option to connect to the audio chair.

3. The device of claim 2, wherein the instructions further cause the handheld device to recognize at least another detached wireless peripheral device available for connection to the handheld device and automatically display the connection screen including offering the player an option to connect to the another wireless peripheral device.

4. The device of claim 1, wherein wirelessly connecting to the audio chair comprises recognizing the audio chair in close proximity to the handheld device and automatically connecting to the audio chair.

5. The device of claim 1, wherein the instructions further cause the handheld device to receive game results for the wagering game from a remote game server.

6. The device of claim 1, wherein the another wireless peripheral device comprises a display device.

7. The device of claim 1, wherein the game sounds include low frequency game sounds enhanced by a bass shaker in the audio chair.

8. The device of claim 1, wherein the instructions further cause the handheld device to wirelessly convey non-game sounds to the wireless controller of the audio chair for playback via the one or more speakers to the player, the non-game sounds including one or more of music, game instructions, and attendant communications.

9. A computer-implemented method of connecting a handheld wagering game device to an audio chair on which a player holding the handheld game device sits, the handheld game device including a wireless communication interface, an input device, and a display device, the audio chair including one or more audio speakers and a wireless controller configured to wirelessly receive game sounds for playback via the one or more audio speakers, the method comprising:

wirelessly connecting the handheld game device to the audio chair via the wireless communication interface;

receiving, in response to an input via the input device, a wager to initiate a wagering game;

displaying, on the display device, the wagering game; and while displaying the wagering game on the display device, wirelessly conveying one or more game sounds to the wireless controller of the audio chair for playback via the one or more speakers to the player.

10. The method of claim 9, further comprising recognizing, via the wireless communication interface, the audio chair in close proximity to the handheld device and automatically displaying a connection screen on the handheld device offering the player an option to connect to the audio chair.

11. The method of claim 10, further comprising recognizing, via the wireless communication interface, at least another detached wireless peripheral device available for connection to the handheld device and automatically displaying the connection screen on the handheld device offering the player an option to connect to the another wireless peripheral device.

12. The method of claim 9, wherein wirelessly connecting comprises recognizing the audio chair in close proximity to the handheld device and automatically connecting to the audio chair.

13. The method of claim 9, further comprising receiving, by the handheld device, game results for the wagering game from a remote game server.

14. The method of claim 11, wherein the another wireless peripheral device comprises a display device.

15. The method of claim 9, wherein the audio chair includes a bass shaker that enhances low frequency sounds of the game sounds.

16. The method of claim 9, further comprising wirelessly conveying nongame sounds to the wireless controller of the audio chair for playback via the one or more speakers to the player, the non-game sounds including one or more of music, game instructions, and attendant communications.

17. A machine-readable, non-transitory medium with instructions stored thereon, the instructions, when executed by one or more processors, cause a handheld wagering game device to perform operations comprising:

wirelessly connecting the handheld game device to an audio chair via a wireless communication interface of the handheld game device;

receiving, in response to an input via an input device of the handheld game device, a wager to initiate a wagering game;

displaying, on a display device of the handheld game device, the wagering game; and while displaying the wagering game on the display device, wirelessly conveying one or more game sounds to a wireless controller of the audio chair for playback to the player via one or more speakers in the audio chair.

18. The medium of claim 17, wherein the operations further comprise recognizing the audio chair in close proximity to the handheld device and automatically displaying a connection screen on the handheld device offering the player an option to connect to the audio chair.

19. The medium of claim 18, wherein the operations further comprise recognizing at least another detached wireless peripheral device available for connection to the handheld device and automatically displaying the connection screen on the handheld device offering the player an option to connect to the another wireless peripheral device.

20. The medium of claim 17, wherein wirelessly connecting comprises recognizing the audio chair in close proximity to the handheld device and automatically connecting to the audio chair.

21. The medium of claim 17, wherein the operations further comprise receiving, by the handheld device, game results for the wagering game from a remote game server.

22. The medium of claim 19, wherein the another wireless peripheral device comprises a display device.

23. The medium of claim 17, wherein the audio chair includes a bass shaker that enhances low frequency sounds of the game sounds.

24. The medium of claim 17, wherein the operations further comprise wirelessly conveying non-game sounds to the wireless controller of the audio chair for playback via the one or more speakers to the player, the non-game sounds including one or more of music, game instructions, and attendant communications.

25. A gaming system, comprising:

an audio chair including one or more audio speakers and a wireless controller configured to wirelessly receive game sounds for playback via the one or more audio speakers; and a computerized handheld wagering game device configured to connect to the audio chair on which a player holding the handheld game device sits, the handheld game device comprising:

a wireless communication interface;

at least one input device;

at least one display device;

one or more processors; and at least one memory device storing instructions that, when executed by the one or more processors, cause the handheld game device to:

wirelessly connect to the audio chair via the wireless communication interface;

receive, in response to an input via the input device, a wager to initiate a wagering game;

display, on the display device, the wagering game; and while displaying the wagering game on the display device, wirelessly convey one or more game sounds to the wireless controller of the audio chair for playback via the one or more speakers to the player.

* * * * *

UNITED STATES PATENT AND TRADEMARK OFFICE

CERTIFICATE OF CORRECTION

PATENT NO. : 8,414,373 B2
APPLICATION NO. : 12/301522
DATED : April 9, 2013
INVENTOR(S) : Bone et al.

It is certified that error appears in the above-identified patent and that said Letters Patent is hereby corrected as shown below:

On the Title page, in column 2, under "Other Publications", line 1, before "International", insert --"--, therefor On the Title page, in column 2, under "Other Publications", line 2, after "2008", insert --"--, therefor On Title page 2, in column 2, under "Other Publications", line 1, before "International", insert --"--, therefor On Title page 2, in column 2, under "Other Publications", line 2, delete "Report," and insert --Report--, therefor On Title page 2, in column 2, under "Other Publications", line 2, after "2008", insert --"--, therefor In the Specifications:

In column 1, line 46, after "ways", delete "the", therefor

In column 1, line 60, after "itself", insert --.--, therefor

In column 6, line 42, delete "(VOIP)" and insert --(VoIP)--, therefor

In column 6, line 63, after "system", insert --.--, therefor

In column 7, line 30, delete "406" and insert --405--, therefor

In column 8, line 10, delete "RFID)" and insert --RFID--, therefor

Signed and Sealed this
Tenth Day of September, 2013

Teresa Stanek Rea
*Acting Director of the United States Patent and Trademark Office*

In the Claims:

In column 9, line 38, in Claim 6, delete "1," and insert --3,--, therefor

In column 10, line 23, in Claim 16, delete "nongame" and insert --non-game--, therefor

UNITED STATES PATENT AND TRADEMARK OFFICE

CERTIFICATE OF CORRECTION

PATENT NO. : 8,414,373 B2
APPLICATION NO. : 12/301522
DATED : April 9, 2013
INVENTOR(S) : Bone et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 994 days.

Signed and Sealed this
Eleventh Day of February, 2014

Michelle K. Lee

Michelle K. Lee
*Deputy Director of the United States Patent and Trademark Office*